(12) United States Patent
Harper

(10) Patent No.: US 6,459,544 B1
(45) Date of Patent: Oct. 1, 2002

(54) REMOVABLE CARTRIDGE FOR DATA-STORAGE MEDIUM

(76) Inventor: Bruce M. Harper, 207 Stillwater La., San Jose, CA (US) 95139

( * ) Notice: Subject to any disclaimer, the term of this patent is extended or adjusted under 35 U.S.C. 154(b) by 0 days.

(21) Appl. No.: 09/196,873

(22) Filed: Nov. 20, 1998

(51) Int. Cl.[7] ............................................. G11B 23/03
(52) U.S. Cl. .................................................... 360/133
(58) Field of Search ........................... 360/133, 97.02, 360/97.04, 99.05, 99.12; 369/291, 289, 77.2, 261

(56) References Cited

U.S. PATENT DOCUMENTS

| | | | |
|---|---|---|---|
| 113,360 A | 4/1871 | Stine | 221/64 |
| 489,710 A | 1/1893 | Lehman | 150/119 |
| 1,992,516 A | 2/1935 | Valenta | 206/525 |
| 2,035,246 A | 3/1936 | Rea | 221/264 |
| 2,088,752 A | 8/1937 | Laitman | 150/121 |
| 2,125,354 A | 8/1938 | Meier | 383/43 |
| 2,325,921 A | 8/1943 | Salfisberg | 221/64 |
| 2,382,977 A | 8/1945 | Courtney | 221/64 |
| RE24,166 E | 6/1956 | Stiller | 150/150 |
| 3,164,298 A | 1/1965 | Repko | 221/282 |
| 3,430,809 A | 3/1969 | Vanstrom | 221/64 |
| 3,444,914 A | 5/1969 | French et al. | 150/139 |
| 3,635,608 A | 1/1972 | Crouch et al. | 206/308.3 |
| 3,739,470 A | 6/1973 | Eppler | 29/628 |
| 3,786,454 A | 1/1974 | Lissner et al. | 340/174.1 |
| 3,941,391 A * | 3/1976 | Ohmiya et al. | 274/9 B |
| 4,078,246 A | 3/1978 | Berthoux et al. | 360/133 |
| 4,106,066 A | 8/1978 | Kudo | 360/133 |
| 4,107,810 A | 8/1978 | Varni et al. | 15/97.1 |
| 4,134,519 A | 1/1979 | Barnett et al. | 221/46 |
| 4,194,224 A | 3/1980 | Grapes et al. | 360/97 |
| 4,269,324 A | 5/1981 | Hausam | 221/36 |
| 4,360,845 A * | 11/1982 | Tajima et al. | 360/133 |
| 4,368,495 A | 1/1983 | Hamanaka et al. | 360/97 |
| 4,449,628 A | 5/1984 | Egly et al. | 206/45.78 |
| 4,459,628 A | 7/1984 | Barton | 360/133 |
| 4,503,474 A | 3/1985 | Nigam | 360/133 |
| 4,517,723 A | 5/1985 | Tschan | 29/235 |
| 4,573,096 A * | 2/1986 | Gerfast | 360/133 |
| 4,604,664 A | 8/1986 | Barski | 360/97 |
| D287,448 S | 12/1986 | Yoo | D6/542 |
| 4,636,904 A | 1/1987 | Matsuno | 360/133 |

(List continued on next page.)

FOREIGN PATENT DOCUMENTS

| | | |
|---|---|---|
| DE | 2939609 A1 * | 4/1981 |
| EP | 144 974 B1 | 10/1989 |
| EP | 632 454 A1 | 1/1995 |

*Primary Examiner*—David Hudspeth
*Assistant Examiner*—Angel Castro

(57) ABSTRACT

One aspect of the present invention provides a removable cartridge device having an elastically deformable, protective enclosure containing a data-storage medium. A normally closed opening or slit extends along a front edge region of the enclosure. The opening is expandable from the closed condition to an opened condition upon application of a compressive force from opposing lateral sides of the enclosure. In the closed condition, the enclosure substantially shields the medium from contaminants in the external environment. In the opened condition, a transducer may enter the enclosure, through the expanded opening, to address the medium. Another aspect of the present invention provides a method for accessing a data-storage medium housed within a resiliently flexible, protective enclosure having a normally closed front edge region. According to one embodiment, the enclosure is compressed at opposing lateral side-edge regions, thereby causing upper and lower confronting surfaces of the enclosure to arc outward to form an opening along the front edge region of the cartridge. A transducer can be inserted through the opening in order to address the medium.

4 Claims, 10 Drawing Sheets

U.S. PATENT DOCUMENTS

| | | | |
|---|---|---|---|
| 4,669,169 A | 6/1987 | Hogg | 29/432 |
| 4,898,477 A | 2/1990 | Cox et al. | 383/33 |
| 4,899,244 A * | 2/1990 | Morse | 360/133 |
| 4,949,868 A | 8/1990 | Olson | 221/64 |
| 4,969,061 A | 11/1990 | Patterson et al. | 360/133 |
| 5,113,297 A | 5/1992 | Yoshida | 360/99.06 |
| 5,174,658 A | 12/1992 | Cook et al. | 383/33 |
| 5,199,230 A | 4/1993 | Gehman | 52/66 |
| 5,204,794 A | 4/1993 | Yoshida | 360/133 |
| 5,218,503 A * | 6/1993 | Martin | 360/133 |
| 5,526,955 A | 6/1996 | Windorski et al. | 221/34 |
| 5,570,252 A | 10/1996 | Sumner et al. | 360/133 |
| 5,588,007 A | 12/1996 | Ma | 371/21.2 |
| 5,638,228 A | 6/1997 | Thomas, III | 360/60 |
| 5,644,444 A | 7/1997 | Braithwaite et al. | 360/60 |
| 5,691,860 A | 11/1997 | Hoppe | 360/97.02 |
| 5,732,058 A * | 3/1998 | Iwamura et al. | 369/75.2 |
| 5,735,408 A | 4/1998 | Fukuda et al. | 206/723 |
| 6,137,771 A * | 10/2000 | McGrath et al. | 369/291 |

* cited by examiner

REMOVABLE CARTRIDGE FOR DATA-STORAGE MEDIUM

FIELD OF THE INVENTION

The present invention relates to media for information storage and retrieval. In particular, the invention provides a removable cartridge device having an elastically deformable, protective enclosure containing a data-storage medium.

BACKGROUND OF THE INVENTION

In the design of disk drives, it is important to minimize the potential for chemical and particulate contamination of the various components. Fine dust and other contaminants can damage the read/write heads and the recording surfaces, resulting in data destruction, head crashes, access errors and the like.

While fixed hard-disk drives can be manufactured and sealed in a clean room to prevent contamination, removable cartridge drives must endure periodic exposure to the external environment. A hermetic seal, like that found with most fixed drives, is not possible with a removable cartridge because read/write heads must be able to get in and out of the cartridge in order to address the magnetic storage disk.

Designers of cartridge-based, removable hard-disk drives have developed various arrangements to minimize the entry of dust and other particulates. One exemplary design includes a clamshell consisting of an upper shell hingedly attached to a mating bottom shell. A pair of spring-loaded latches holds the two shells together in a closed position. In operation, the cartridge is inserted into a drive bay where two projecting pins force the latches back, allowing the top and bottom shells to pivot away from each other, thus providing an opening for a read/write head assembly to enter and address a magnetic storage disk. According to another design, a flexible metal gate is mounted for sliding movement within a channel along an edge of a cartridge. When the cartridge is inserted into the drive, the gate slides open to provide access for the heads to address a disk.

While useful for reducing particulate contamination from extrinsic sources, the above arrangements introduce intrinsic sources. For example, moving parts exposed to the cartridge interior, such as hinges, spring-loaded latches and sliding gates, can create particulate debris from frictional and rubbing forces that can be deposited on the media surface. In addition, such mechanical parts often require lubricants to reduce wear that can contribute significant levels of chemical contaminants. As a further disadvantage, such mechanically intensive constructions can be complex and expensive to produce, as well.

There is, thus, a need for a cartridge-based, removable disk drive that minimizes both extrinsic and instrinsic contamination, yet is relatively simple in design and inexpensive to produce.

SUMMARY OF THE INVENTION

One aspect of the present invention provides a data-storage medium cartridge device. More particularly, the invention provides a data-storage medium housed within an elastically deformable, protective enclosure. The cartridge device is adapted for repeated insertion into, and removal from, a drive unit.

According to one embodiment, the cartridge device includes an enclosure containing a data-storage medium, such as a hard disk, floppy disk or compact disk (CD). Structure is provided for coupling an external drive, such as a motor-driven spindle, to the data-storage medium. An opening is provided along a front edge region of the enclosure which, upon application of a sufficient compressive force from opposing lateral sides of the enclosure, is expandable from (i) a normally closed condition at which the medium in the enclosure is substantially shielded from contaminants in the external environment, to (ii) an opened condition permitting the entry of a transducer, such as a read/write head, to address the medium.

According to one embodiment, the enclosure includes upper and lower shell portions formed at least in part of an elastically resilient material (e.g., a polycarbonate with a carbon-fiber filler). The shell portions are disposed adjacent to one another with confronting, inner surfaces defining a cavity for receiving the data-storage medium. The shell portions have peripheral regions that are joined together to form a substantially permanent seal, except along the front edge region of the enclosure. First and second elongated flaps extend from the upper and lower shell portions, respectively, along the front edge region of the enclosure, with adjacent regions of the elongated flaps defining the expandable opening.

In one embodiment, the adjacent regions of the elongated flaps meet, in the closed condition, to form a substantially airtight seal. In another embodiment, the adjacent regions of the elongated flaps overlap one another, in the closed condition, to form a tongue-in-groove or labyrinth-type seal.

The structure for coupling an external drive to the medium includes, according to one embodiment, a spindle-insertion aperture extending through a central region of the lower shell portion, and a hub assembly disposed in the enclosure coaxially with the aperture. In this embodiment, the hub supports the data-storage medium at a central region thereof.

In one embodiment, the hub is urged against the lower shell portion, across the aperture, in the absence of a compressive force from opposing lateral sides of the enclosure (i.e., when the front edge region of the enclosure is in the closed condition), thereby shielding the cavity from the external environment. An annular gasket or seal (e.g., a TEFLON® ring) can be disposed between the hub assembly and the inner surface of the lower shell portion around the aperture.

According to one embodiment, a plurality of crease lines are formed in the shell portions. The crease lines are thinner in cross-section (i.e., the measured distance through a shell portion between its inner and outer surfaces) than adjacent shell-portion regions so that the shell portions prefer to bend at the crease lines when stressed by a compressive force from opposing lateral sides of the enclosure. The crease lines can be, for example, living hinges formed integrally with the shell portions, or thinned sections formed by scoring, as with a laser or knife.

One embodiment provides biasing structure for urging the adjacent regions of the flaps together from an open condition to the closed condition. The biasing structure can include, for example, (i) a normally flat leaf spring extending along at least one of the flaps, and/or (ii) a spring member disposed internally within the enclosure in pressing engagement with opposing lateral sides of the enclosure. In this latter construction, the spring tends to push the opposing lateral sides of the enclosure away from one another.

In one exemplary construction, the enclosure of the device is substantially box-shaped, with expansive central regions of the upper and lower shell portions defining upper and lower major surfaces, respectively, and the joined peripheral regions defining substantially rectangular, lateral sidewalls.

The enclosure can be assembled from separately formed component parts (e.g., distinct upper and lower half-shells), or it can be molded from a single piece of material. One embodiment provides a living hinge between upper and lower shell portions integrally formed from a single piece of plastic. In this embodiment, the upper and lower shell portions are folded towards one another about the living hinge.

In one embodiment, all of the lateral sidewalls are integrally formed and continuous with the upper and lower shell portions. That is, the enclosure is a seamless, mitten-like construction. According to another embodiment, two of the lateral sidewalls, located adjacent the opening, are formed by bonding overlapping peripheral regions of the upper and lower shell portions. The bond can be, for example, a fusion bond. Further in this embodiment, one of the lateral sidewalls, located across from the opening, is integrally formed and continuous with the upper and lower shell portions.

In another of its aspects, the present invention provides a method for accessing a data-storage medium, such as a disk, housed within a resiliently flexible, protective enclosure having a normally closed front edge region.

According to one embodiment, the method includes the steps of:
  (i) compressing the enclosure at opposing lateral side-edge regions, thereby causing upper and lower confronting surfaces of the cartridge to bulge or arc outward to form an elongated opening along the front edge region of the cartridge; and
  (ii) inserting a read/write head through the opening and addressing the data-storage medium.

In one embodiment, the enclosure includes upper and lower shell portions formed at least in part of an elastically resilient material (e.g., plastic). The shell portions are disposed adjacent one another with confronting, inner surfaces defining a cavity for receiving the data-storage medium. The shell portions have peripheral regions that are joined together to form a substantially permanent seal, except along the front edge region of the enclosure. First and second flap portions extend from the upper and lower shell portions, respectively, along the front edge region of the enclosure, with adjacent regions of the flaps defining the opening.

These and other features and advantages of the present invention will become clear from the following description.

BRIEF DESCRIPTION OF THE DRAWINGS

The structure and manner of operation of the invention, together with the further objects and advantages thereof, may best be understood by reference to the following description taken in conjunction with the accompanying drawings, in which.

DETAILED DESCRIPTION OF THE INVENTION

Figure 1:
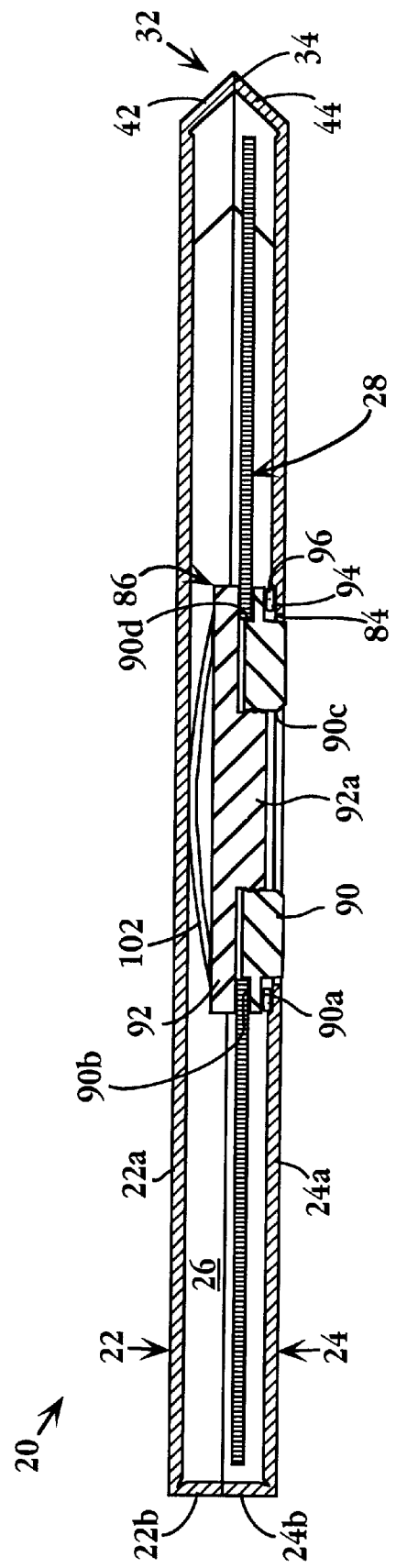
FIG. 1 is a side cross-sectional view of a data-storage medium cartridge device, in accordance with an embodiment of the present invention.

The following discussion of the preferred embodiments of the present invention is merely exemplary in nature. Accordingly, this discussion is in no way intended to limit the scope of the invention, application of the invention, or the uses of the invention.

One aspect of the present invention provides a data-storage medium cartridge device. Generally, according to this aspect of the invention, a data-storage medium is held within a protective enclosure. Means are provided permitting an external drive, such as a motor-driven spindle, to engage and rotate the data-storage medium about its central axis. A normally closed opening extends along a front edge region of the enclosure. The opening is expandable from the closed condition to an opened condition upon application of a compressive force from opposing lateral sides of the enclosure. In the closed condition, the enclosure substantially shields the medium from contaminants in the external environment. In the opened condition, a transducer, such as a read/write head assembly, may enter the enclosure to address the medium.

Now, with initial reference to the side-sectional and exploded views of FIGS. 1 and 2, one preferred embodiment of the cartridge device of the invention will be described in detail. In the illustrated embodiment, an enclosure, indicated generally by the reference numeral 20, is formed from upper and lower shell portions, depicted as half-shells 22 and 24 respectively, disposed adjacent one another. For reasons that will become apparent, each shell portion is formed, at least in part, of a rigid, but elastically deformable material.

The particular material composition of the enclosure is not critical. Preferably, the material provides the enclosure with an elastic restoring force in response to certain minor deformations, described more fully below. Exemplary materials for forming the enclosure include plastics, such as polyethylene, polypropylene and/or polycarbonate. In one embodiment, the enclosure is formed of a resilient polycarbonate with a carbon-fiber filler. The carbon-fiber filler imparts a static dissipative characteristic to the enclosure. This feature minimizes the buildup of a static charge on the enclosed components, such as the data-storage medium. It should be appreciated that static charges are undesirable in that charged objects may attract deleterious contaminants.

Figure 2:
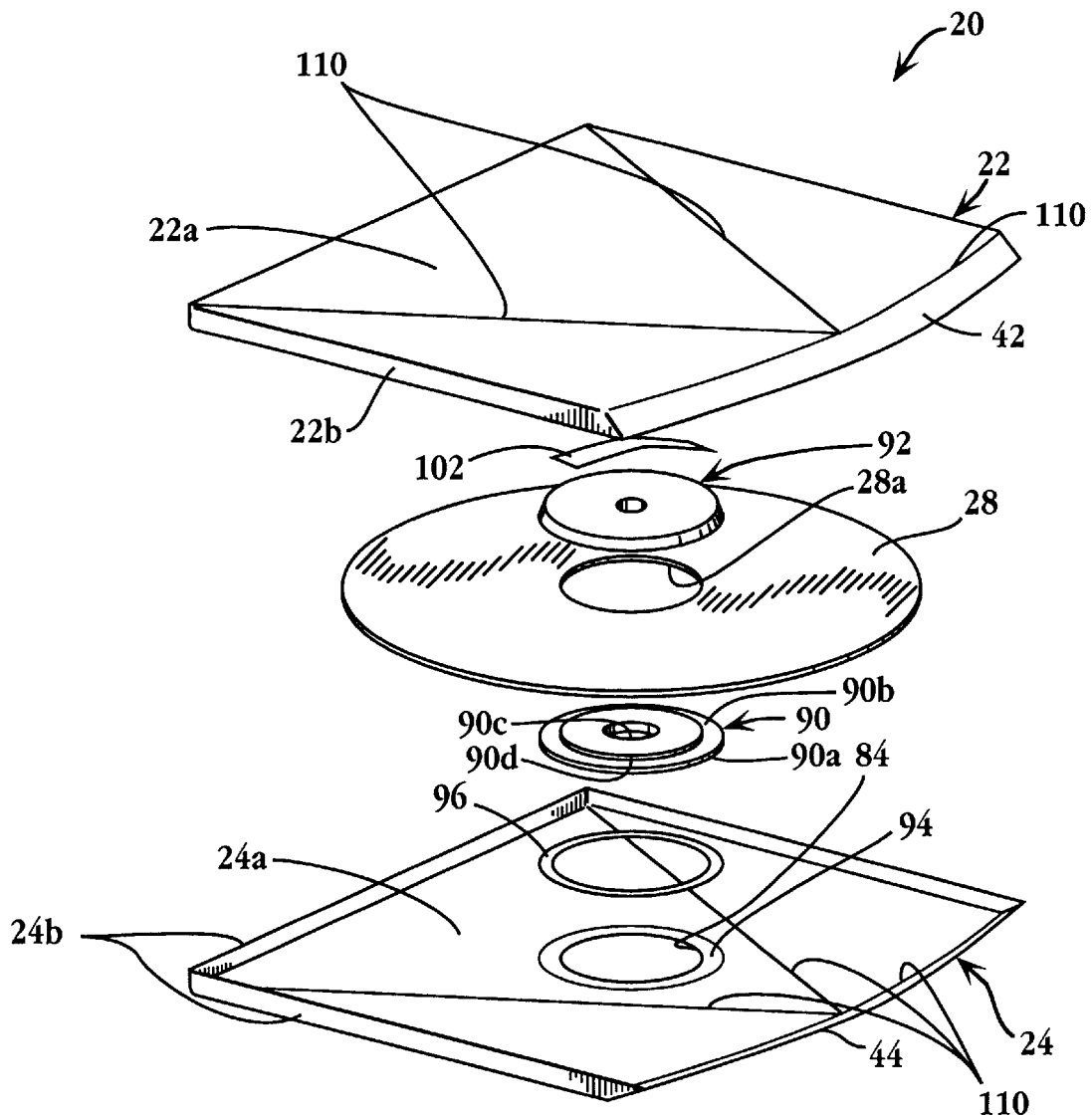
FIG. 2 is an exploded perspective view of the data-storage medium cartridge device of FIG. 1.

With continued reference to the embodiment of FIGS. 1 and 2, each half-shell 22, 24 is configured with a shallow dish shape. More particularly, each half-shell includes an expansive central plate portion, 22a and 24a respectively, having upstanding peripheral-edge regions 22b, 24b projecting therefrom. Upon bringing opposing peripheral-edge regions 22b, 24b together, as shown in FIG. 1, the confronting inner surfaces of the shell portions define a cavity, indicated as 26, adapted to receive and carry a data-storage medium, such as thin-film disk or platter 28.

The upstanding peripheral-edge regions of half-shells 22, 24 are joined in a manner effective to form a substantially permanent, preferably airtight, barrier to external contaminants, except along a front edge region, indicated by the reference numeral 32, whereat the peripheral edges of the half-shells come together to define a transverse, reversibly-expandable opening or slit 34, described more fully below. The permanently joined regions can be bonded, for example, by way of conventional solvents, adhesives, and/or thermal methods. According to one preferred embodiment, the joining is by laser fusion. For example, opposing peripheral-edge regions from confronting shell portions can be disposed with laterally overlapping sides, and the overlapping portions laser bonded such that the bond is not directly exposed to the cavity. In this way, the risk of out-gassing contamination is reduced.

In the box-like enclosures shown in the accompanying drawings, the joined peripheral-edge regions along each side of the enclosure define three substantially planar, rectangular sidewalls. It should be appreciated, however, that these regions may be of any other suitable shape instead (e.g., arced, angled, etc.).

Along the front-edge region 32 of enclosure 20, the terminal edges of peripheral-edge regions 22b, 24b remain free, defining laterally (side-to-side) elongated lips or flaps 42, 44, respectively. Together, the free edges of adjacent flaps 42, 44 define a reversibly expandable opening or slit 34 extending across the front-edge region 32 of the enclosure 20 from one lateral side to an opposing lateral side.

In a normal (unstressed) state, the free edges of flaps 42, 44 are in close proximity to one another, so that the slit 34 is substantially closed. The normal, closed condition can be maintained by the natural resiliency of the cartridge material to assume its original, molded configuration, and/or by employing biasing means operative to urge the flaps 42, 44 into close proximity.

Figure 4A:
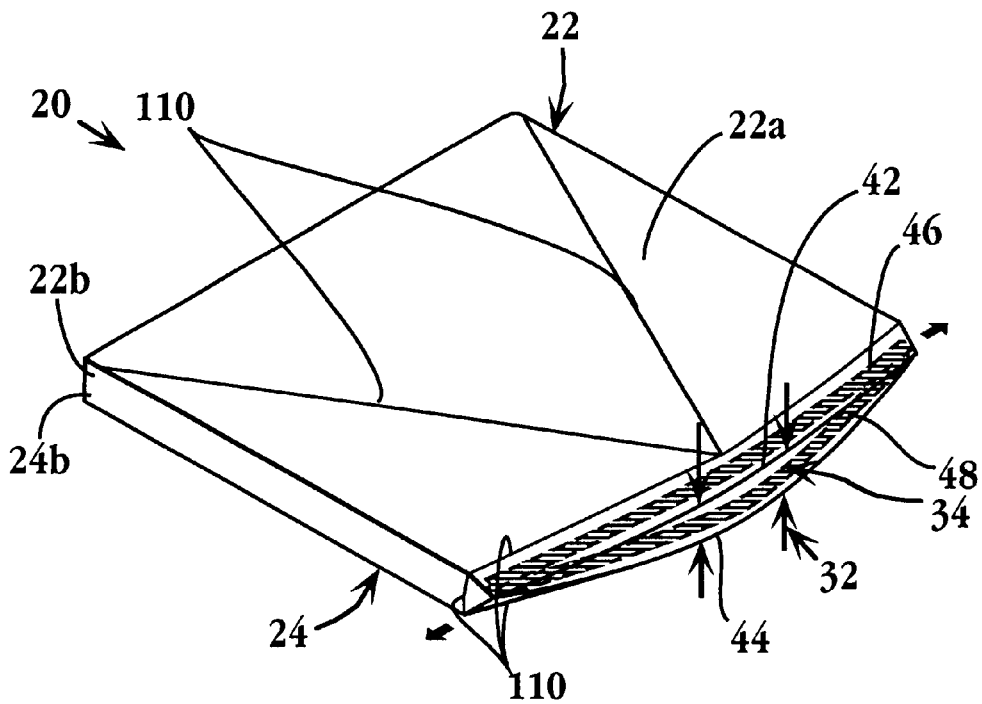
FIGS. 4(A) and 4(B) are perspective views, with portions depicted in phantom, showing spring-biasing assemblies for urging an expandable opening of a protective enclosure to a closed condition, according to certain embodiments of the present invention.

In one embodiment, depicted in FIG. 4(A), such biasing means includes a normally flat leaf spring 46, 48 extending along each flap. Leaf springs 46, 48 are formed of an elastically resilient material, having a normally flat (planar) shape. Upon deflection, the desire of each spring 46, 48 to maintain its natural flat (unstressed) state urges the flaps 42, 44 to the closed condition. The leaf springs 46, 48 can be embedded within the cartridge material, e.g., by introduction during molding; or they can be attached to the flap surfaces subsequent to molding, e.g., permanently applied using an appropriate adhesive.

Figure 4B:
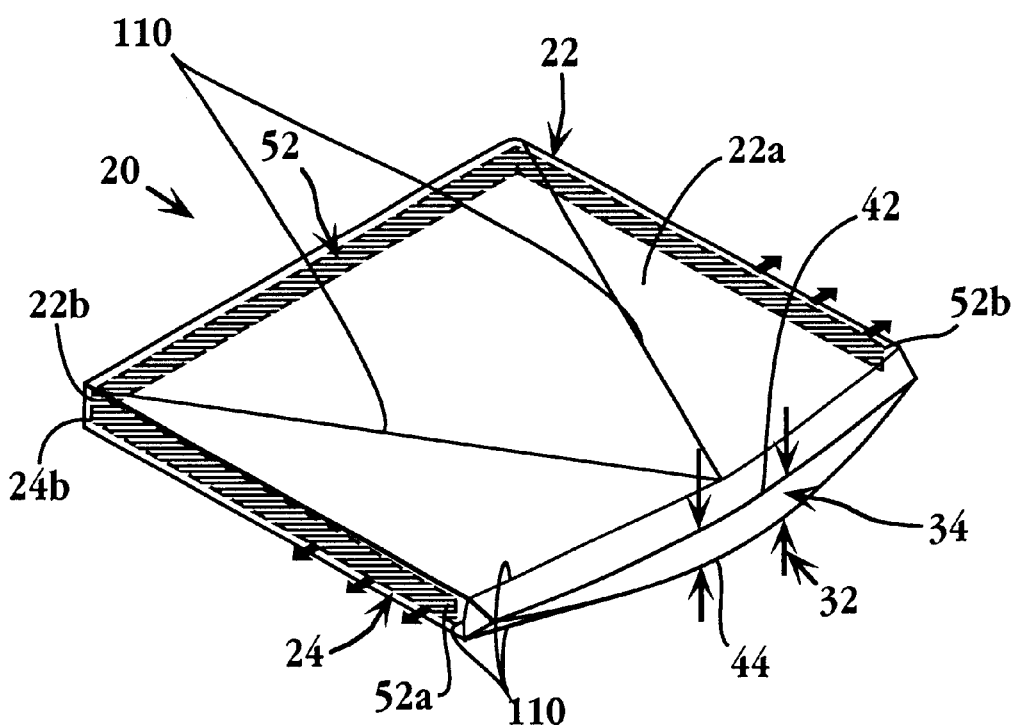

In an alternative embodiment, shown in FIG. 4(B), the biasing means includes a substantially U-shaped spring member, indicated by the reference numeral 52, disposed inside enclosure 20. Spring member 52 extends along three sidewalls formed by the bonded peripheral-edge regions 22b, 24b, and has free ends, denoted as 52a and 52b, terminating proximate opposing sides of the expandable opening 34. In the depicted configuration, side arms 52a, 52b tend to diverge from one another, thereby applying an outward pressure against opposing lateral sides of the opening 34 and urging the flaps 42, 44 into the closed condition.

Figure 5:
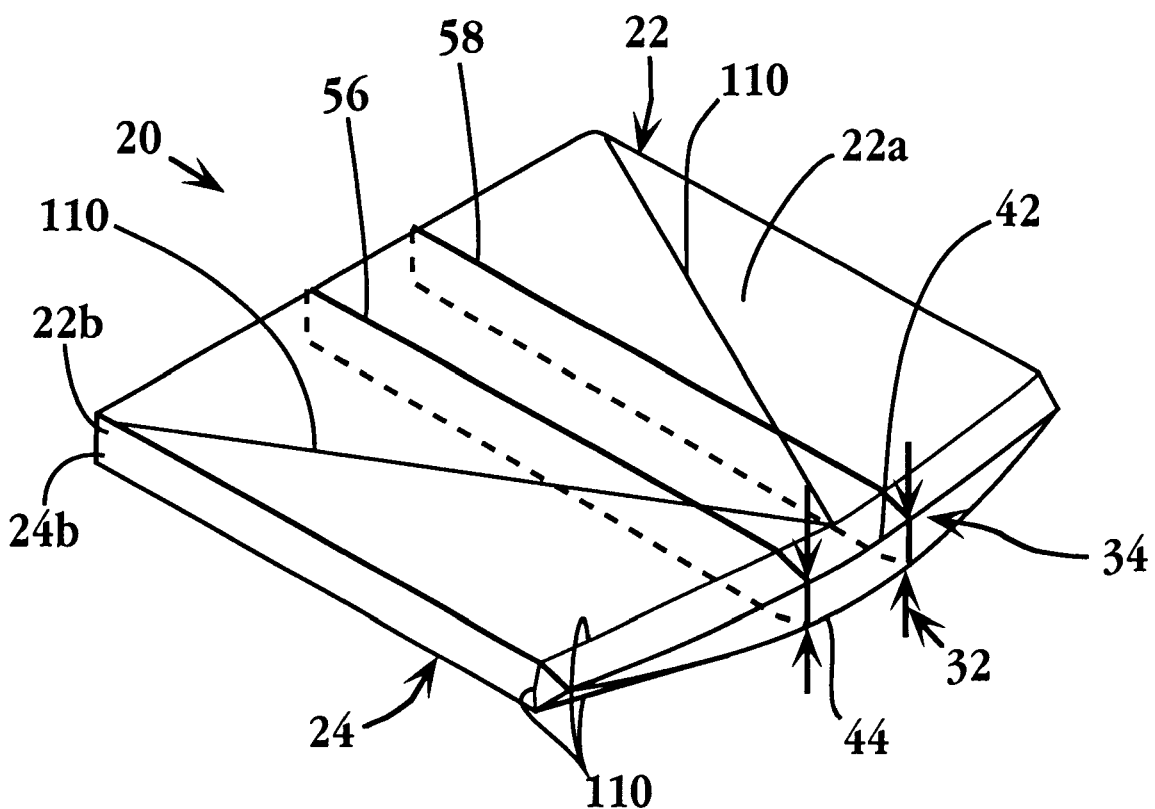
FIG. 5 is a perspective view, with portions depicted in phantom, showing a pair of distended elastic bands disposed to urge an expandable opening of a protective enclosure to a closed condition, according to an embodiment of the present invention.

In still a further embodiment, illustrated in FIG. 5, the biasing means include a pair of distended elastic bands, such as 56 and 58, encircling the enclosure 20 from front to back. In their desire to contract, bands 56, 58 urge the flaps 42, 44 to the closed condition.

In the closed condition, flaps 42, 44 shield against the entry of contaminants (e.g., dust and the like) into enclosure 20 from the external environment. Optionally, structure can be provided to supplement or enhance the barrier function of flaps 42, 44. For example, according to certain embodiments, the closed flaps 42, 44 form an airtight seal along the front-edge region 32 of the enclosure 20. Certain other embodiments, while permitting the passage of air through the closed opening 34, discourage line-of-sight transmissions.

Figure 6:
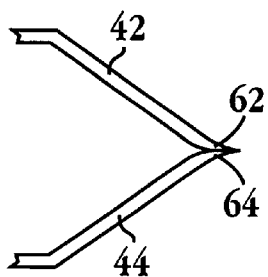
FIG. 6 is a side cross-sectional view showing feathered edges formed along an expandable opening of a protective enclosure for holding a data-storage medium, in accordance with an embodiment of the present invention.
Figure 7:
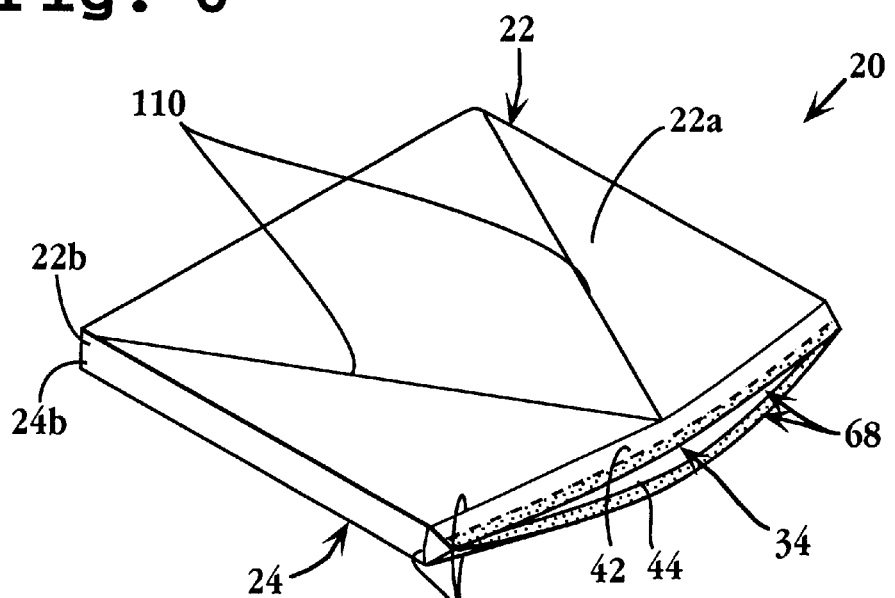
FIG. 7 is a perspective view, with portions depicted in phantom, showing a soft elastomeric coating disposed along an expandable opening of a protective enclosure for holding a data-storage medium, in accordance with an embodiment of the present invention.

In a particular embodiment, shown in FIG. 6, flaps 42, 44 are provided with feathered edges 62, 64 along their interfacing regions, whereat the thickness of the material diminishes to a thin, sharp profile. The feathered edges readily deform into compliance against each other in the closed condition. In another embodiment, depicted in FIG. 7, a soft elastomeric coating, indicated at 68, is applied to each lip edge that provides a compliant, tight seal when the opposing edges meet in the closed condition. Suitable elastomeric coatings can include, for example, silicone, TEFLON® (trademark of E. I. du Pont de Nemours and Company), urethane, and/or buna, and the like.

Figure 8:
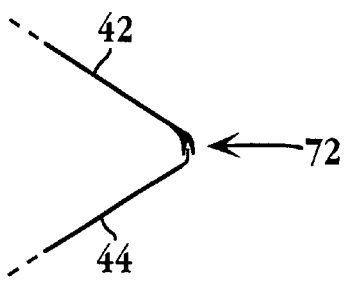
FIG. 8 is a partial side-sectional view of a tongue-in-groove or labyrinth-type closure structure for deterring the entry of contaminants into a protective enclosure holding a data-storage medium, according to an embodiment of the present invention.

In a further embodiment, adjacent regions of flaps 42, 44 overlap one another in the closed condition, to form a tongue-in-groove or labyrinth-type closure, e.g., as denoted by the reference numeral 72 in the partial side-sectional view of FIG. 8. In this embodiment, flaps 42, 44 overlap, but do not abut one another when disposed in the closed condition. By providing a slight gap between the flaps, particulate generation due to frictional forces (e.g., rubbing) can be avoided. Alternatively, the flap edges can be configured to contact one another in the closed condition, e.g., should a substantially airtight closure be desired.

Rather than forming the enclosure from two separate shell portions, the enclosure can be integrally formed as a unitary component. In an exemplary construction, one lateral sidewall is integrally formed and continuous with both the upper and lower shell portions, and the remaining lateral sidewalls are formed by bonding overlapping peripheral-edge regions of the upper and lower shell portions. For example, upper and lower half-shells 22, 24 can be molded in a continuous sheet of plastic, indicated generally in FIG. 9 by the reference numeral 78. In the illustrated embodiment, an integrally formed hinge member, denoted as 76, separates the two half-shells 22, 24, extending across the short dimension of the plastic sheet 78 therebetween. Preferably, hinge member 76 is a resilient, reduced-thickness region formed in the plastic sheet 78. For example, hinge member 76 can be constructed as a so-called "living hinge," or it can be formed by scoring the sheet 78, e.g., with a laser or knife.

Figure 10:
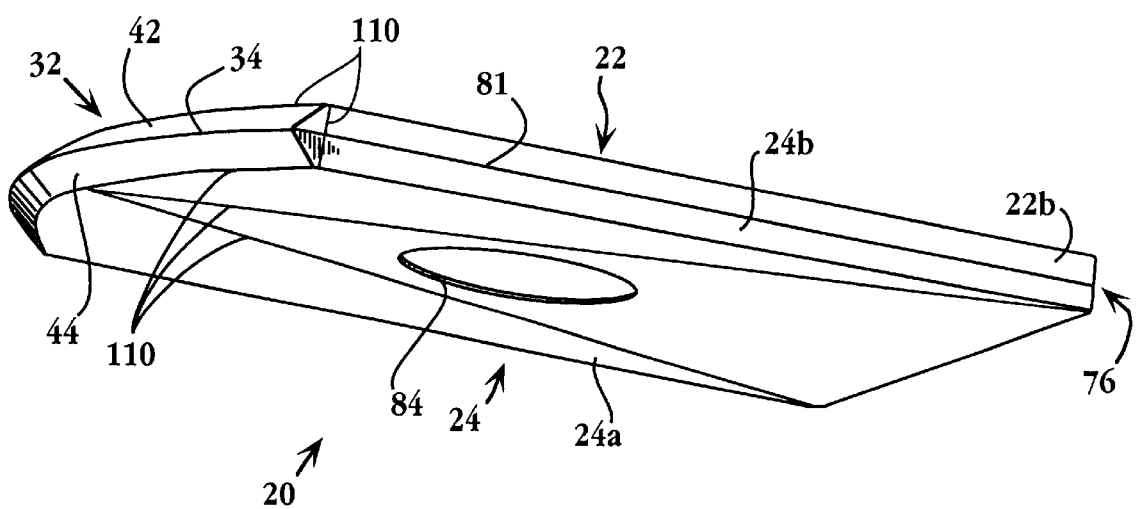
FIG. 10 is perspective view of the shell portions of FIG. 9, with the upper and lower shell portions fully folded toward one another.

The upper and lower shell portions 22, 24 are folded toward one another about hinge 76 until the upstanding peripheral-edge regions 22b, 24b meet, as shown in FIG. 10. A thin-film disk and hub assembly, described below, can be disposed to reside in a resulting cavity between the folded shell portions 22, 24. The upstanding peripheral-edge regions 22b, 24b are then joined on the two sides adjacent to the hinge 76 in order to form permanently bonded sidewalls. A resultant seam, as at 81, running along each of the bonded lateral sidewalls, is visible in the embodiment of FIG. 10.

In an alternative embodiment, the enclosure is molded as a unitary mitten-like structure (not shown), with the disk/hub assembly subsequently inserted into an opening along a front edge region. In this embodiment, all of the sidewalls are integrally formed and continuous with the upper and lower shell portions. Thus, the mitten-like construction can be substantially seamless.

With reference once again to FIGS. 1 and 2, structure is provided for coupling an external drive (not shown) to the thin-film medium 28 contained within enclosure 20. Such structure can include, for example, a spindle-insertion aperture, as indicated by the reference numeral 84, extending through a substantially central region of lower half-shell 24 and a hub assembly, denoted generally as 86 (FIG. 1), disposed inside enclosure 20 coaxial with aperture 84. Thin-film disk 28 is secured to the hub assembly 86 by any suitable method, e.g., as by use of appropriate adhesives and/or mechanical techniques, such as described below.

In an exemplary arrangement, hub assembly 86 clamps disk 28, from above and below, about a region adjacent a central opening defined by an inner side-edge 28a of disk 28, so that the disk moves axially and rotates with the hub assembly. In the particular embodiment of FIGS. 1 and 2, a first, cylindrical hub member 90 has an annular expanded-diameter portion, formed along a region between the hub member's upper and lower longitudinal ends, that defines a shelf 90b for supporting a lower face of disk 28 at an annular region surrounding central opening 28a. Above shelf 90b, a peripheral sidewall of hub member 90, denoted as 90d, extends into the disk's central opening and abuts side-edge 28a, as best seen in FIG. 1. A second hub member 92 engages the opposing side of disk 28 along an annular region adjacent the disk's central opening. Second hub member 92 has a centrally located shaft portion 92a (FIG. 1), depending from its lower face, configured to press-fit within a central bore 90c extending axially through first hub member 90. The fit of shaft portion 92a within bore 90c is very snug, such that disk 28 will remain tightly clamped between the two hub members 90, 92 throughout the anticipated useful life of the assembly.

Figure 3A:
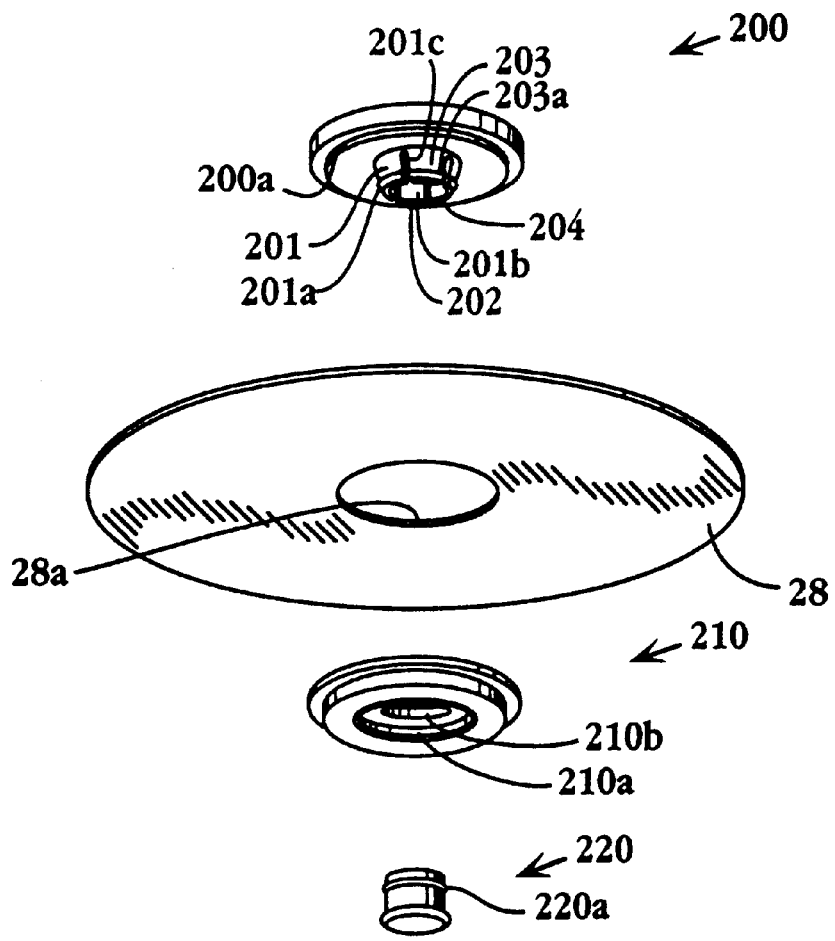
FIG. 3(A) is an exploded perspective view of an alternative hub assembly for use in the data-storage medium cartridge device of FIGS. 1 and 2, according to an embodiment of the invention.
Figure 3B:
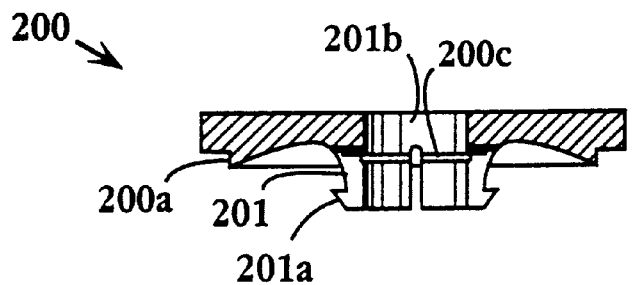
FIG. 3(B) is a side cross-sectional view of the upper hub member depicted in FIG. 3(A).

An alternative hub assembly is shown in FIGS. 3(A) and 3(B). In this arrangement, first and second hub members, respectively denoted as 200 and 210, are adapted to engage a disk 28, from above and below, about an annular region adjacent a central opening defined by an inner side-edge 28a of the disk. In a preferred embodiment, the first hub member is of a molded plastic construction, and the second hub member is a stamped, magnetic element. First hub member 200 includes a shoulder 200a having an outer, annular surface that fits with close tolerance in the central opening 28a of disk 28. It should be appreciated that shoulder 200a serves to locate and center the disk 28. Four depending tangs, denoted as 201–204, are disposed in a generally circular arrangement about the circumference of a central bore 220b extending axially through hub member 200. Each tang 201–204 is formed with an outwardly extending flange defining a catch portion at its lower end, such as catch portions 201a and 203a of tangs 201 and 203, respectively. Upon pressing the first and second hub members together, tangs 201–204 enter a central bore 210a extending axially through second hub member 210. Tangs 201–204 are deflected inwardly as they pass a reduced-diameter rim 210b defining a constriction zone within bore 210a. Once the catch portions reach a position clear of the rim, they snap outward, locking hub members 200, 210 together with disk 28 clamped snugly therebetween. To insure that first hub member 200 does not deform and separate from second hub member 210 over time, a pin or plug 220 is pressed into axial bore 210a of lower hub member 210 and into engagement with the inner sidewalls of tangs 201–204. Pin 220 is provided with an annular ridge 220a adapted to snap into a matching groove or depression 200c formed in bore 200b of first hub member 200. In this way, first hub member 200 maintains an axially directed force clamping it to disk 28 and second hub member 210.

When the enclosure 20 is in the closed condition, a lower region of the hub assembly is positioned at the enclosure's lower inner surface, proximate the spindle-insertion aperture. For example, with particular reference to FIGS. 1 and 2, the expanded-diameter portion of hub member 90 can define an annular shoulder or bearing surface, denoted as 90a, extending around the outer peripheral region of its lower face. When enclosure 20 is in the closed condition, the bearing surface 90a rests on an annular, recessed region 94 formed in the inner surface of lower half-shell portion 24, around aperture 84. Optionally, an annular gasket, such as seal ring 96, can be disposed between the bearing surface 90a of lower hub member 90 and the annular, recessed region 94 about aperture 84. In one preferred embodiment, the gasket is formed of a material resistant to particulate generation due to contact and/or rubbing forces with the lower hub member 90 or shell portion 24. For example, seal ring 96 can be made of TEFLON®.

In one preferred embodiment, the hub assembly is urged against the inner surface of the lower shell portion, across the spindle-insertion aperture, when the enclosure is assuming its normal, closed condition, thereby shielding the cavity against contaminant intrusion via the aperture. In an exemplary arrangement (not shown), a centrally located region of the inner surface of the upper shell portion continuously presses against a topmost region of hub assembly when the enclosure is in the closed condition. In another embodiment, illustrated in FIGS. 1 and 2, a spring member, such as shallow-arced leaf spring 102, is interposed between the inner surface of the upper shell portion 22 and an upper region of the hub assembly 86. Spring member 102 can be secured, for example, either to the top of the hub assembly 86 or the inner surface of the upper shell portion 22. When enclosure 20 is in the closed condition, spring member 102 is operative to press the lower surface of the hub assembly 86, such as region 90a of lower hub 90, into compliance with the annular recess 94 in the lower shell portion 24, with a given force. In addition to shielding aperture 84, the pressing engagement of the hub assembly 86 with the lower shell portion 24 helps to immobilize the disk 28 and maintain its proper positioning in the closed cartridge.

Once the cartridge is fully inserted within the drive, a drive motor and its spindle are brought into engagement with the hub assembly. In one embodiment (not shown), the spindle is provided with a male-splined upper portion that cooperates with a female-splined bottom portion of the hub assembly for providing a releasable sliding spline connection. In another embodiment (not shown), the spindle includes a magnetic insert, and a lower portion of the hub is constructed from material susceptible to magnetic attraction. When the spindle is close to the hub, it magnetically engages the hub. In both embodiments, after the hub is engaged with the spindle, the motor-driven spindle can lift the hub/disk assembly to a free, central position (i.e., out of contact with the interior surfaces of the enclosure) and rotate the disk as is required for operation.

As previously mentioned, the normally closed opening 34 extending along the front edge region 32 of the enclosure 20 is expandable from the closed condition to an opened condition upon application of a compressive force from opposing lateral sides of the enclosure. In one embodiment, half-shells 22, 24 are configured to bulge outwardly, under sufficient force, thereby changing the transverse shape of slit 34 to create an opening sufficient to permit the entry and exit of a read/write head assembly (not shown), as described more fully below. For example, such expansion can cause the shape of slit 34 to change from roughly that of a line to that of an elongated ellipse.

In this regard, enclosure 20 can be provided with strategically positioned hinges or fold zones that determine the geometry of the enclosure under compression. For example, a plurality of crease lines can be formed in the shell portions, with each crease line having a thinner cross-section than adjacent shell-portion regions so that the shell portions prefer to fold or bend at the crease lines when sufficiently stressed by a compressive force from opposing lateral sides of the enclosure.

In one embodiment, the crease lines are living hinges integrally formed with the shell portions. In another embodiment, the crease lines are thinned sections formed by scoring, e.g., with a laser or knife. In an exemplary configuration, an enclosure having a wall thickness within the range of from about 0.50 mm to about 1.15 mm is provided with crease lines having a groove depth of from about 0.15 mm to about 0.25 mm.

The crease lines can extend, for example, along the upper shell portion and/or the lower shell portion, including the flaps and sidewalls. Exemplary configurations for such crease lines, denoted generally as 110, are depicted in the drawings.

Figure 9:
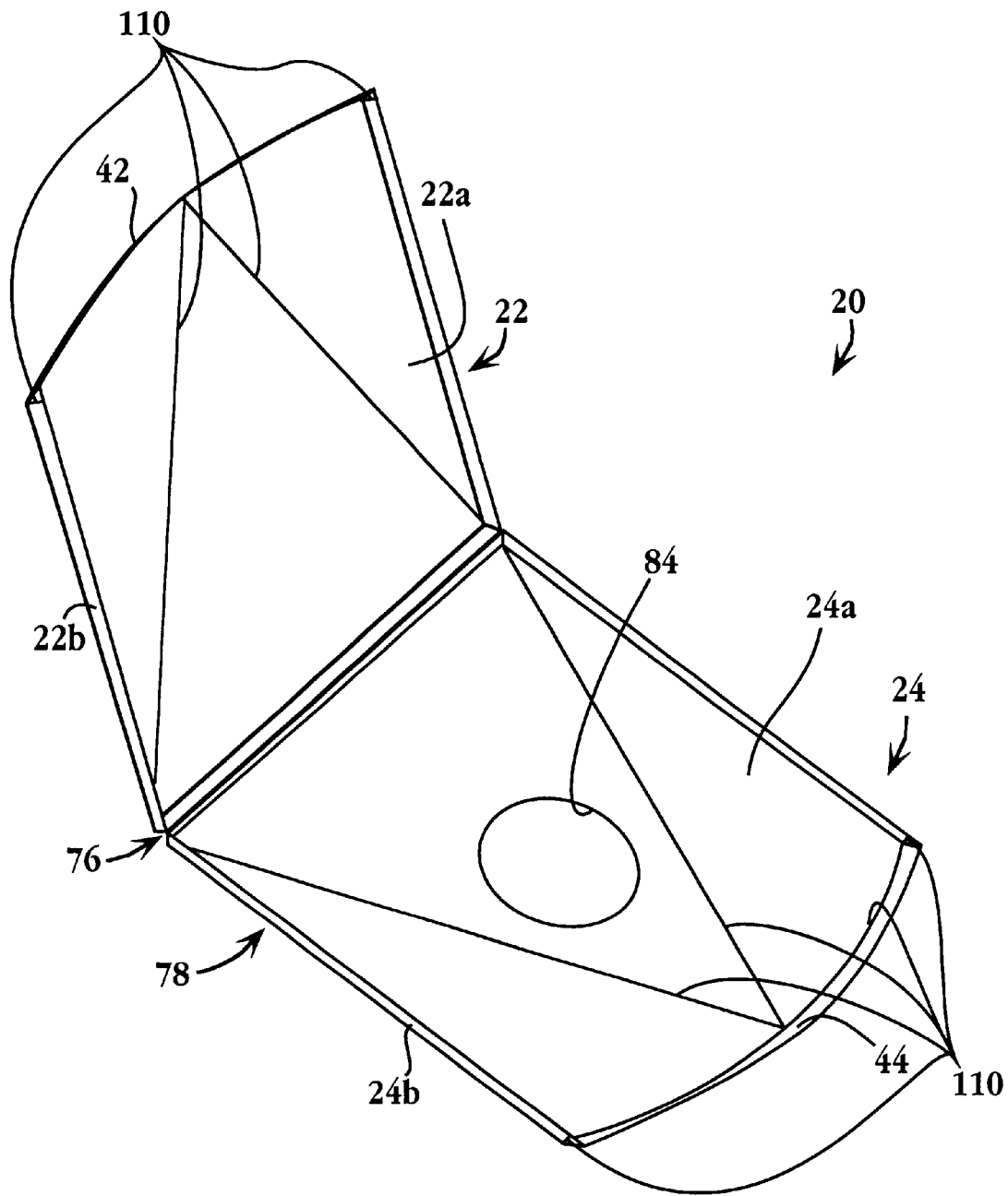
FIG. 9 is a perspective view showing integrally formed upper and lower shell portions of a protective enclosure, partially folded toward one another, according to the teachings of one embodiment of the present invention.
Figure 11A:
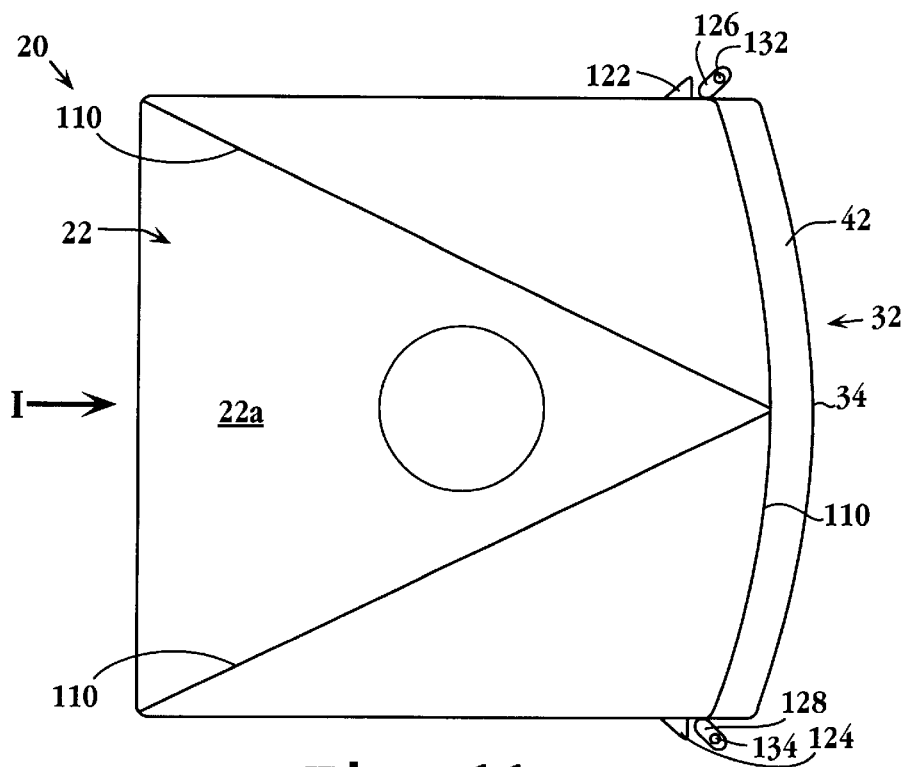
FIG. 11(A) is a top plan view showing a protective enclosure for holding a data-storage medium and structure for pressing the lateral sidewalls of the enclosure toward one another, according to an embodiment of the present invention.
Figure 11B:
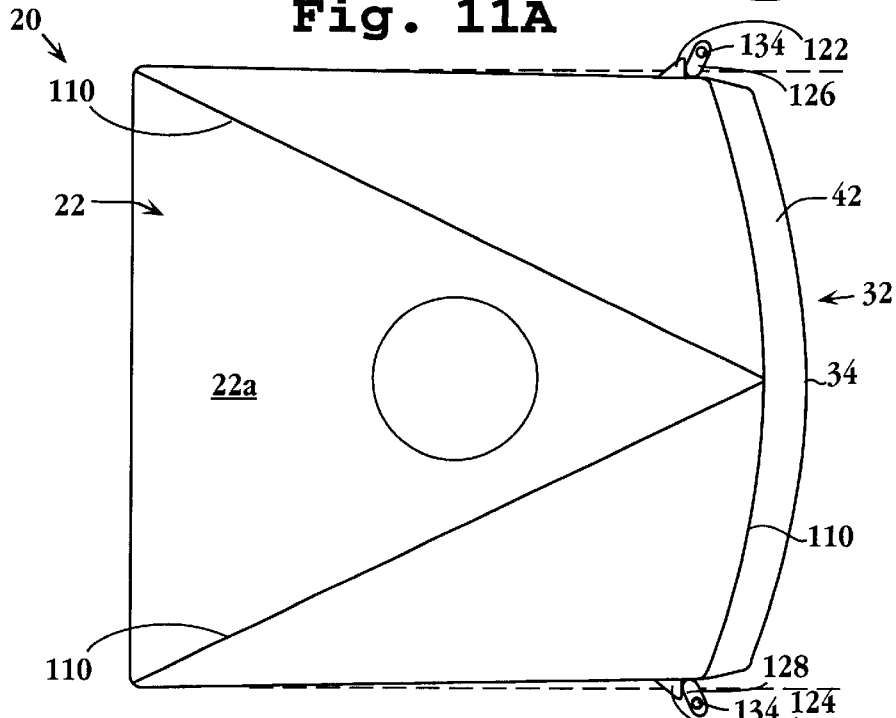
FIG. 11(B) is a top plan view of the protective enclosure of FIG. 11(A), with the lateral sidewalls of the enclosure deflected toward one another.
Figure 11C:
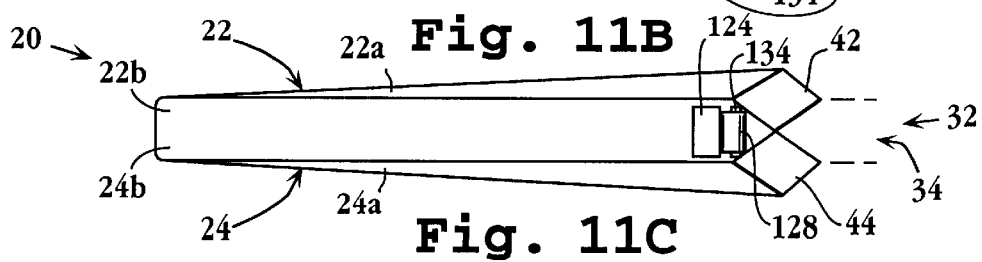
FIG. 11(C) is a side elevational view of the protective enclosure depicted in FIG. 11(B), further showing an expanded opening along a front edge region of the enclosure.

FIGS. 9 through 11, for example, show two crease lines 110 formed along the expansive plate portion 22a, 24a of each upper and lower half-shell 22, 24, extending from the rearward corners of each half-shell 22, 24 to a point midway across front edge region 32, proximate a respective flap 42, 44. A shorter crease line 110 is provided along a front region of each lateral sidewall, proximate the expandable opening 34, extending between confronting edges of the upper and lower expansive plate portions, 22a, 24a. A further crease line extends across each shell portion 22, 24, from one lateral side to the other, along the front edge region 32 of enclosure 20, defining a boundary between each expanse portion 22a, 24a and a respective flap 42, 44. In operation, the application of sufficient opposing side forces will cause the enclosure 20 to arc or bulge outward along its upper and lower expansive plate portions 22a, 24a, e.g., as shown in FIG. 11(C), thereby expanding the opening 34 at the front edge region 32 of the enclosure 20.

It should be appreciated that such outward expansion of the upper and lower shell portions facilitates positioning of the disk/hub assembly clear of the inner surfaces of the enclosure by a motor-driven spindle.

Figure 12:
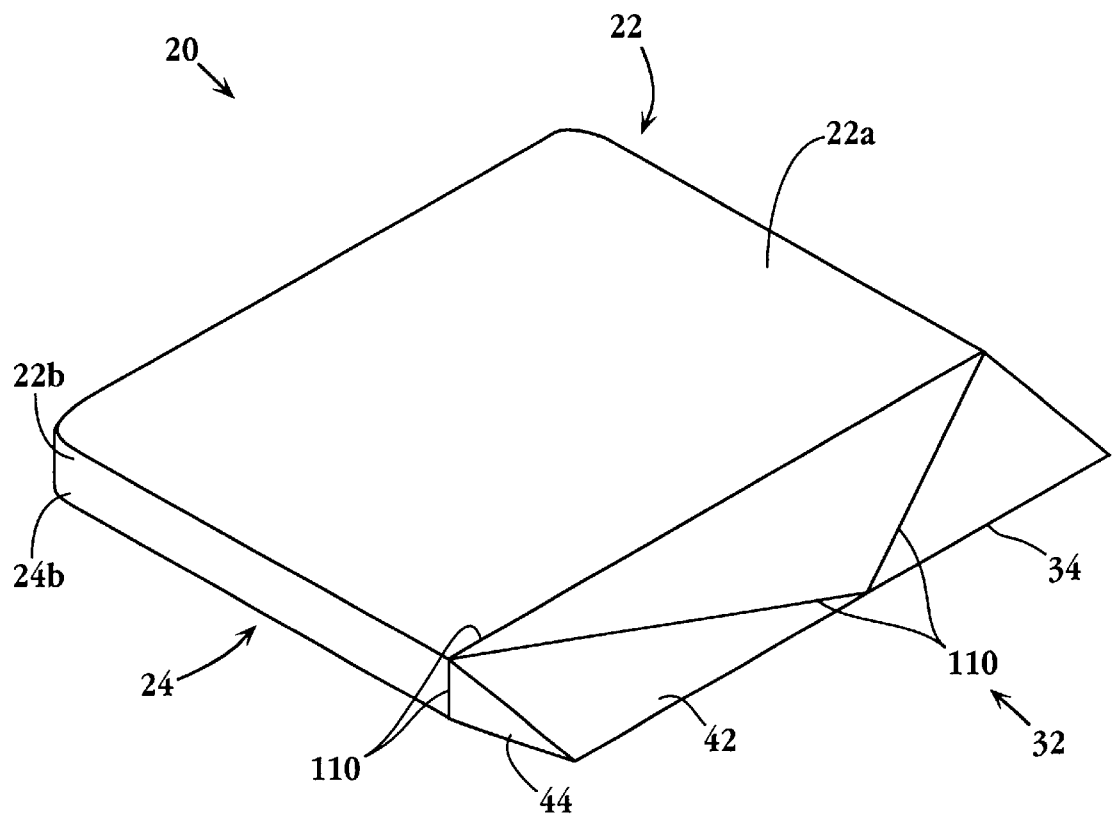
FIG. 12 is a perspective view showing a protective enclosure for holding a data-storage medium, having crease or fold lines extending along upper and lower flaps proximate an expandable opening.

FIG. 12 shows a further embodiment in which crease lines 110 are provided only near and along the front edge region 32 of the enclosure 20. In this embodiment, crease lines 110 extend from the rearward corners of each flap 42, 44 to a point midway across the forwardmost edge of each flap 42, 44, proximate the slit 34. Similar to the previous embodiment, a short crease line 110 is provided along a front region of each lateral sidewall, proximate the expandable opening 34, extending between confronting edges of the upper and lower expansive plate portions, 22a, 24a. A further crease line extends across each shell portion 22, 24, from one lateral side to the other, along the front edge region 32 of enclosure 20, defining a boundary between each expanse portion 22a, 24a and a respective flap 42, 44. In operation, the application of sufficient force, from opposing lateral side-edge regions near or at the flaps 42, 44, will cause the flaps 42, 44 to arc or bulge outward, thereby expanding the opening 34 at the front edge region 32 of the enclosure 20. The opposing upper and lower expansive plate portions 22a, 24a, on the other hand, remain in substantially the same relationship with each other (i.e., generally parallel to one another).

Since this embodiment cannot rely upon movement of the upper expanse 22a to assist in pressing down on the hub assembly to form a seal over the spindle-insertion aperture (as previously described), other means in this regard are provided. One embodiment (not shown), for example, provides a simple magnetic annulus coupling for holding the hub against the lower, inner surface of the enclosure over the aperture when the enclosure is in the closed condition. Upon engaging the hub and rotating it using a dogged drive spindle, a repelling pole orientation can be established, effective to separate the magnetic coupling elements. Once clear, the magnetic coupling elements are held apart by the spindle extension. In another embodiment (not shown), the hub assembly is provided with an extended (longitudinally elongated) profile when the enclosure is in the closed condition. In the extended condition, the top of the hub assembly presses against the upper, inner surface of the enclosure, thereby biasing the lower side of the hub assembly against the lower, inner surface of the enclosure, over the aperture. The hub, in this embodiment, is a compound assembly having two integral, opposing circular cam surfaces biased relative to each other but separated by balls interposed between the cam faces. Sudden spindle activation forces a relaxation of the extended hub profile (contraction), allowing free and clear rotation of the hub and associated disk within the enclosure. Similarly, sudden deceleration allows the cam surfaces to bias the compound hub back into an extended profile, thereby sealing the enclosure. According to yet a further embodiment (not shown), the drive motor first engages a high helix screw (pin) threaded into the center of the hub. The rotation of the drive backs the screw away from the cassette top freeing the disk/hub and, with further rotation, the screw bottoms against the hub thus causing rotational motion in the hub. A slight detent holds the helix pin in its retracted mode and a motor reversal breaks it free allowing it to be driven up against the cassette top by a slight spring force (integral to the hub).

It should be appreciated that the crease lines 110, in each of the above-described embodiments, assist in defining a consistent folding action and lip-opening configuration for the enclosure. Crease lines, however, are not critical to the proper functioning of the cartridge. For example, one embodiment (not shown) allows the enclosure to bulge against selective constraints within the drive chassis itself, without the use of any crease lines or the like.

The removable disk cartridge of the present invention is adapted for repeated insertion into, and removal from, a complementary drive chassis. Prior to insertion, the enclosure is maintained in a substantially closed condition, as previously described, to prevent the entry of contaminants. In the drive, means are provided for inwardly deflecting the opposing lateral sides of the enclosure, adjacent either end of the front-edge slit, thereby causing the enclosure to open along the slit to expose and render accessible the enclosed data-storage medium.

According to one embodiment (not shown), motor-driven arms or rods are provided in the drive unit along each lateral side of a cartridge-receiving bay. When the arms are disposed in a retracted position, the cartridge device of the invention can be inserted and seated within the bay. Once the cartridge is properly seated, the arms can be driven towards one another such that they engage and press upon opposing lateral side-edge regions of the enclosure with a force sufficient to cause the opening at the front edge region to expand.

In another embodiment, depicted in FIGS. 11(A)–11(C), enclosure 20 is provided with a fixed protruding lug, such as 122 and 124, extending outwardly from each lateral side. The drive unit (not shown), in turn, is provided with pawls 126, 128 that are pivotally connected at one end to pivot pins 132, 134 at opposing lateral side regions of the drive. The free end of each pawl 126, 128 extends partially into the cartridge-receiving bay, angled slightly towards the entry/ exit port at the front of the bay. As the cartridge is pushed into the bay, in the direction of arrow "I" (FIG. 11(A)), the lugs 122, 124 approach the pawls 126, 128. As the cartridge is pushed towards its seated position, the lugs 122, 124 engage the pawls 126, 128, causing the pawls to swing inwardly against opposing lateral sidewalls of the enclosure 20 (FIG. 11(B)). This results in a "squeeze" action that causes the opening 34 at the front edge region 32 of the enclosure 20 to expand, as shown in the side view of FIG. 11(C). The broken horizontal lines in FIG. 11(B) illustrate the normal, unstressed position of each sidewall as compared to the position assumed under compression, depicted in solid lines.

In still a further embodiment (not shown), a stationary wedge is disposed along each lateral side of a cartridge-receiving bay. Opposing sidewalls of the wedges are arranged such that the distance between them progressively decreases (narrows) along a direction from the front region of the bay toward the rear region of the bay. When the cartridge device is inserted into the bay, the opposing sidewalls of the wedges abut respective lateral side-edge regions of the enclosure. As the cartridge device is pushed towards the rear of the bay, a progressively increasing pressure is applied against each lateral side of the enclosure, causing the opening at the front edge region of the enclosure to expand.

In the opened condition, a transducer (not shown), such as a read/write head assembly, may enter the enclosure via the expanded opening to address the medium. In a typical arrangement, a flying or floating magnetic head device is used for a magnetic disk cartridge.

In another of its aspects, the present invention provides a method for accessing a data-storage medium housed within a resiliently flexible, protective enclosure having a normally closed front edge region.

According to one embodiment, the enclosure (in the closed condition) is inserted into a cartridge-receiving bay of a drive unit. One end of a motor-driven spindle passes through a spindle-insertion aperture along the bottom surface of the enclosure and engages a hub supporting a data-storage disk within the enclosure, thereby securing the position of the disk along a plane. The enclosure is compressed at opposing side-edge regions, thereby expanding a normally closed opening along the front edge region of the enclosure. The spindle supports the hub assembly and disk at a position clear of the inner surfaces of the enclosure, and rotates the disk at an appropriate speed. A transducer, such as a read/write head, is inserted through the opening to address the spinning disk.

Upon withdrawing the transducer, disengaging the spindle from the disk/hub assembly, and removing the cartridge device from the bay, the enclosure reassumes its normal, closed condition.

Those skilled in the art can now appreciate from the foregoing description that the broad teachings of the present invention can be implemented in a variety of forms. Therefore, while this invention has been described in connection with particular embodiments and examples thereof, the true scope of the invention should not be so limited. Various changes and modification may be made without departing from the scope of the invention, as defined by the appended claims.

What is claimed is:

1. A method for accessing a data-storage medium housed within a resiliently flexible, protective enclosure having a normally closed front edge region, comprising:

compressing the enclosure at opposing lateral side-edge regions, thereby causing upper and lower confronting surfaces of the enclosure to bulge outward to form an opening along the front edge region of the enclosure; and inserting a read/write head through the opening and addressing the data-storage medium.

2. The method of claim 1, wherein said enclosure includes:

upper and lower shell portions formed at least in part of an elastically resilient material;

said shell portions being disposed adjacent one another with confronting, inner surfaces defining a cavity for receiving said data-storage medium;

said shell portions having peripheral regions that are joined together to form a substantially permanent seal, except along said front edge region of said enclosure, and first and second elongated flaps extending from said upper and lower shell portions, respectively, along said front edge region of said endosure, with adjacent regions of said elongated flaps defining said opening.

3. The enclosure of claim 2, further comprising:

a plurality of crease lines formed in said shell portions;

each crease line having a thinner cross-section than adjacent shell-portion regions so that said shell portions bend at said crease lines when stressed by a compressive force from opposing lateral sides of the enclosure.

4. The endosure of claim 3, wherein said crease lines are living hinges integrally formed with said shell portions.

* * * * *